(12) United States Patent
Nagaralu et al.

(10) Patent No.: US 8,566,298 B1
(45) Date of Patent: Oct. 22, 2013

(54) METHOD AND APPARATUS FOR SHARING RESOURCE LOCKS AMONGST APPLICATIONS

(75) Inventors: Sree Hari Nagaralu, Pune (IN); Milind Borate, Pune (IN); Murali Nagaraj, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1735 days.

(21) Appl. No.: 11/191,500

(22) Filed: Jul. 28, 2005

(51) Int. Cl.
*G06F 17/30* (2006.01)

(52) U.S. Cl.
USPC .......................................................... 707/704

(58) Field of Classification Search
USPC .......................................................... 707/704
See application file for complete search history.

(56) References Cited

U.S. PATENT DOCUMENTS

| | | | |
|---|---|---|---|
| 4,574,350 A * | 3/1986 | Starr | 710/200 |
| 5,287,521 A * | 2/1994 | Nitta et al. | 710/200 |
| 6,493,804 B1 * | 12/2002 | Soltis et al. | 711/152 |
| 6,499,031 B1 | 12/2002 | Hopmann et al. | |
| 6,598,068 B1 * | 7/2003 | Clark | 718/104 |
| 6,748,470 B2 * | 6/2004 | Goldick | 710/200 |
| 6,751,617 B1 * | 6/2004 | Anfindsen | 707/8 |
| 6,772,255 B2 * | 8/2004 | Daynes | 710/200 |
| 6,879,242 B1 * | 4/2005 | Alon | 340/5.6 |
| 6,910,039 B2 * | 6/2005 | Daynes | 707/8 |
| 6,922,694 B2 * | 7/2005 | Daynes | 707/8 |
| 6,964,029 B2 * | 11/2005 | Poznanovic et al. | 716/7 |
| 2004/0117372 A1 * | 6/2004 | Kasman | 707/9 |
| 2004/0186825 A1 * | 9/2004 | Dettinger et al. | 707/3 |
| 2005/0010816 A1 * | 1/2005 | Yu et al. | 713/201 |

\* cited by examiner

*Primary Examiner* — Robert Beausoliel, Jr.
*Assistant Examiner* — Noosha Arjomandi
(74) *Attorney, Agent, or Firm* — Campbell Stephenson LLP

(57) ABSTRACT

A method and apparatus for sharing an exclusive lock for a resource amongst a defined plurality of applications. A first application to lock a resource is given a key. The first application may provide the key to other applications to allow those applications to simultaneously access the locked resource. Generally, the first application will only provide keys to applications that are compatible with the first application such that the applications having keys to a resource will be able to simultaneously access the resource without conflict.

18 Claims, 5 Drawing Sheets

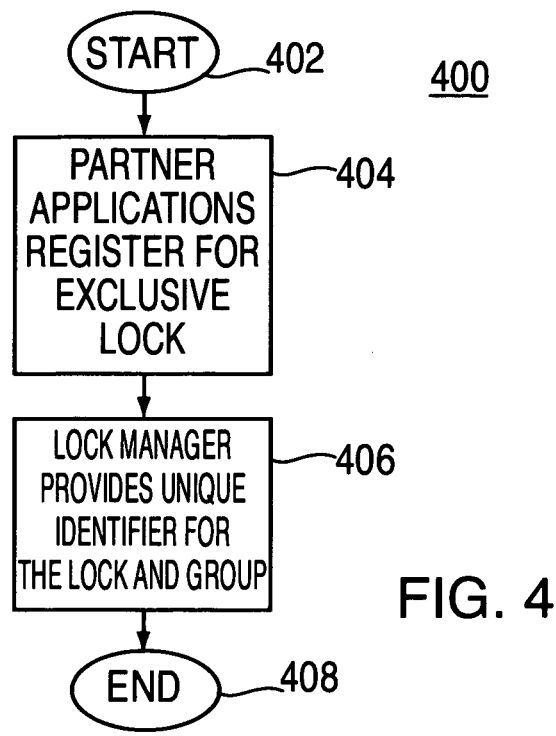
FIG. 4
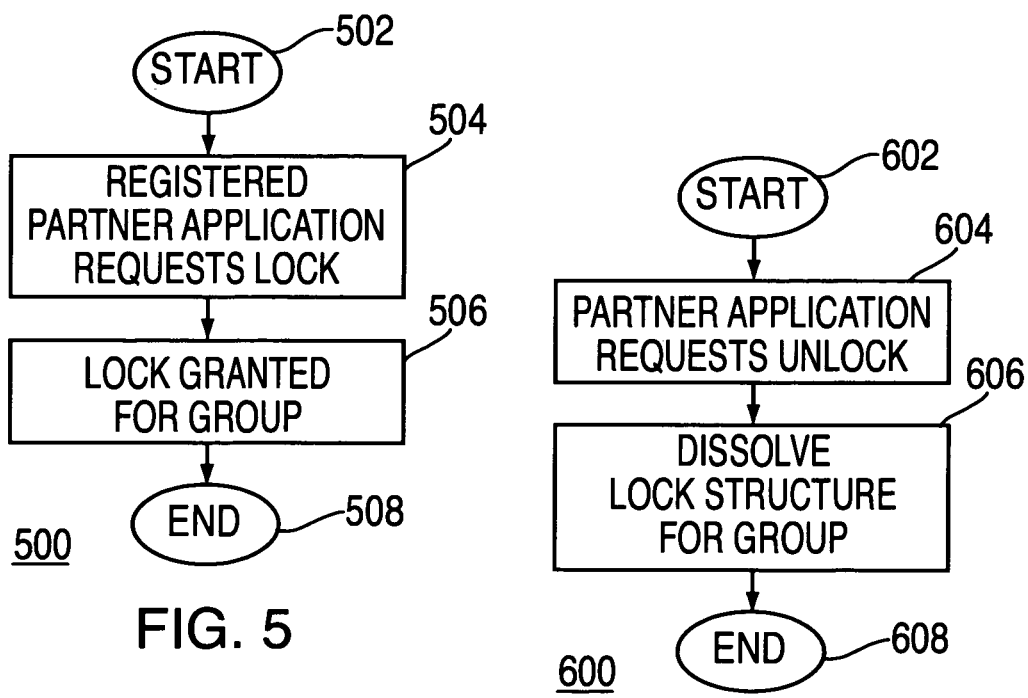
FIG. 5
FIG. 6

METHOD AND APPARATUS FOR SHARING RESOURCE LOCKS AMONGST APPLICATIONS

BACKGROUND OF THE INVENTION

1. Field of the Invention

Embodiments of the present invention generally relate to computer networks that share resources amongst applications and, more particularly, to a method and apparatus for sharing a resource lock amongst applications.

2. Description of the Related Art

A significant advantage of computer networks is that a user can remotely access a document, an image, a printer, backup storage, or other resources. Computer networks, and the Internet, in particular, have rendered the geographic location of a user irrelevant. The Internet contains a vast number of resources that are available to practically anyone with an Internet connection. In a similar manner, local area networks can make documents, applications, printers, and other resources available to anyone connected to the local area network.

This ability to remotely access a resource has greatly enhanced the ability of people and businesses to work together more quickly and efficiently. This is especially true of a remote resource that is collaboratively produced or otherwise utilized.

Additionally, individual nodes of a network may simultaneously execute multiple software applications that access and utilize resources with the network or within the computer executing the applications. The speed of computers enables such simultaneous execution of applications. As such, individual nodes and multiple nodes of a network may execute applications that utilize the same resources.

When multiple applications of a network (whether executing on a single node or multiple nodes) need to utilize a resource at the same time, a collision or deadlock may occur. Consequently, applications are designed to utilize locks to block multiple applications from simultaneously attempting to use a resource, i.e., access to a resource is serialized. Locks generally come in two types: exclusive and shared. An exclusive lock, when used by an application running on a particular node, blocks all other applications from accessing the resource during the period that the lock is enabled. A shared lock permits an application to access a resource, but allows other applications executing on the same or other nodes to also have unlimited access to the resource. The other applications that may access the resource are only limited by the security features of the network.

A shared lock may also be "color coded" where the shared lock is assigned a color and applications that have been assigned the same color may utilize the same colored locked. Thus, the locks are only granted to applications having the same color.

Serialization using exclusive locks for individual applications might result in an inefficient use of resources. In some instances, a number of applications may simultaneously utilize a resource without conflict; however, the underlying assumption of exclusive lock techniques is that simultaneous use of a resource is to be avoided. On the other hand, shared locks are too liberal in their allowance of applications to simultaneously use a resource. Shared locks invite conflicts by allowing open access to resources.

It would be beneficial if groups of compatible applications could be provided exclusive access to a resource, while applications that do not belong to the group, i.e., applications that may cause conflicts, are blocked from such access for a period of time while the lock is enabled.

SUMMARY OF THE INVENTION

The present invention is a method and apparatus for sharing a resource lock amongst a defined plurality of applications. A first application to lock a resource is given a key. The first application may provide the key to other applications to allow those applications to simultaneously access the locked resource. Generally, the first application will only provide keys to applications that are compatible with the first application such that partner applications having keys to a resource will be able to simultaneously access the resource without conflict. In a second embodiment, two keys are issued: one for exclusive mode locks and one for shared mode locks. The application that is issued these keys can share exclusive or shared access to the locked resource. In a third embodiment, multiple keys are issued/provided for multiple colored locks. By distributing to the various partner applications different keys of different colors, the applications can be categorized into different color modes according to their respective keys. In a forth embodiment of the invention, a lock manager, using a registration process, assigns a unique identifier to a group of partner applications. Any application in the group may access a locked resource associated with the unique identifier.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 depicts a flow diagram of a method of assigning a unique identifier to a group of applications;

FIG. 5 depicts a flow diagram of a method of using a unique identifier assigned by the method of FIG. 4;

FIG. 6 depicts a flow diagram of a method of dissolving a lock created by the method of FIG. 5.

DETAILED DESCRIPTION

The present invention is a method and apparatus for sharing resource locks amongst applications. The shared exclusive locks enable applications to selectively share resource utilization with other applications.

Figure 1:
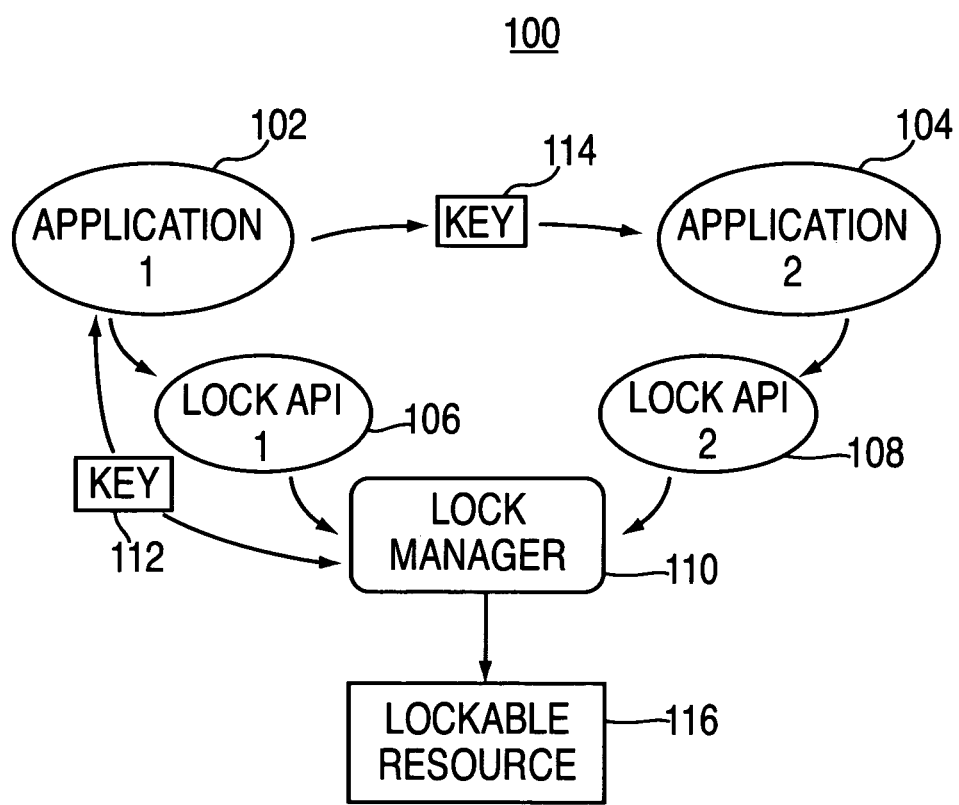
FIG. 1 depicts a block diagram of a software architecture of one embodiment of the invention.

FIG. 1 depicts a block diagram of software architecture 100 that forms one embodiment of the invention. The architecture 100 comprises a plurality of applications 102, 104, a lock API 106, 108 associated with each application 102, 104, a lock manager 110 and a lockable resource 116. The applications 102 and 104 are deemed to be compatible, in that, these "partner" applications are able to simultaneously access and utilize the resource 116 without conflict. The term "application" includes any form of process or program comprising a single thread of execution, multiple threads of execution or combinations thereof. As discussed below with respect to FIG. 7, the architecture 100 may be executed on a single computer (single node), on several computers (multiple nodes), or in a distributed fashion across a plurality of nodes. As used herein, a resource refers to computer readable media, programs, processes, threads, applications, memory, printing devices, networks, network connections, files, folders, directories, input/output devices, ports, documents, spreadsheets, operating systems, and more. Generally speaking, a resource is an object, device or entity that can receive or send data. A resource can also be formed by any critical section of a program code to which access is to be serialized.

In operation, application 102, using the lock API 106, requests the lock manager 110 to lock the resource 116. The application 102 shares a key 112 to the lock with another application 104, i.e., partner application 104 is given a key 114. The partner application 104 can then use its associated lock API 108 to interact with the lock manager 110 to access and utilize the locked resource 116. In one embodiment of the invention, the lock manager 110 supplies the key 112 for the locked resource. In another embodiment, the key 112 is supplied by the application 102 and the lock manager creates a lock that matches the key 112.

Figure 2:
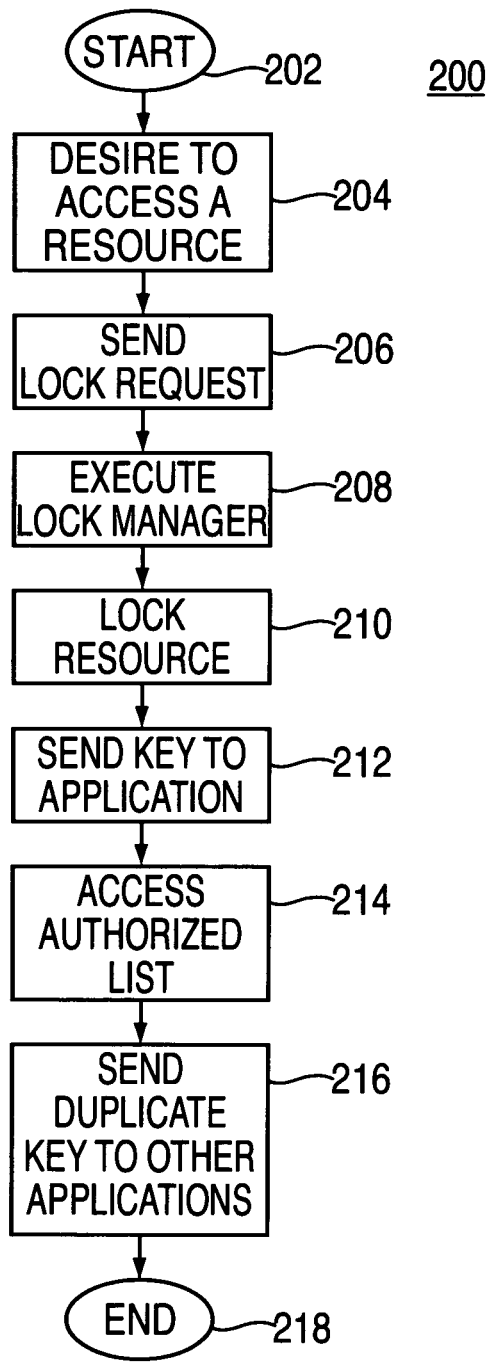
FIG. 2 depicts a flow diagram of a method for sharing a resource lock in accordance with one embodiment of the invention.

FIG. 2 depicts a flow diagram of a method 200 of locking a resource using the architecture 100 in accordance with the present invention. The method 200 begins at step 202 and proceeds to step 204 where an application 102 desires access to a resource 116 using a Uniform Resource Identifier (URI). At step 206, a lock request is sent to the lock manager 110. At step 208, the lock manager determines whether the lock is free/available and then grants an exclusive lock. At step 210, the lock for the resource is established by, for example, setting a locking bit on a file. This lock may be set using a policy, such as a first come, first served basis, a last-come, first-served basis, an application priority basis, an application importance basis, or any other policy.

At step 212, a key 112 is sent from the lock manager 110 to the application 102. Alternatively, the application 102 provides the key 112 and the lock manager creates a lock for the resource 116 that matches the key 112. At step 214, the application 102 that requested and received the key 112 shares a duplicate of the key 114 with at least one other application 104 to create a plurality of applications 102, 104 that can share the resource. Generally, the lock API 106 accesses a list of applications that can compatibly access the resource 116. At step 216, the application sends the key to the other applications on the same node or other nodes. When those applications wish to use the resource, they may use the key 114 to unlock the resource 116 for their use. The method 200 ends at step 218. Using the inventive architecture 100, the first application (elected by some policy such as first-come-first-served, or application priorities, etc.) to request the exclusive lock for a particular resource, creates an authorized plurality of applications that may compatibly and simultaneously access the resource.

The lock manager may establish time limits in which the key is enabled such that a group can only use a key for a pre-established period of time. Thus, access to the resource is serialized by group of applications.

Figure 3:
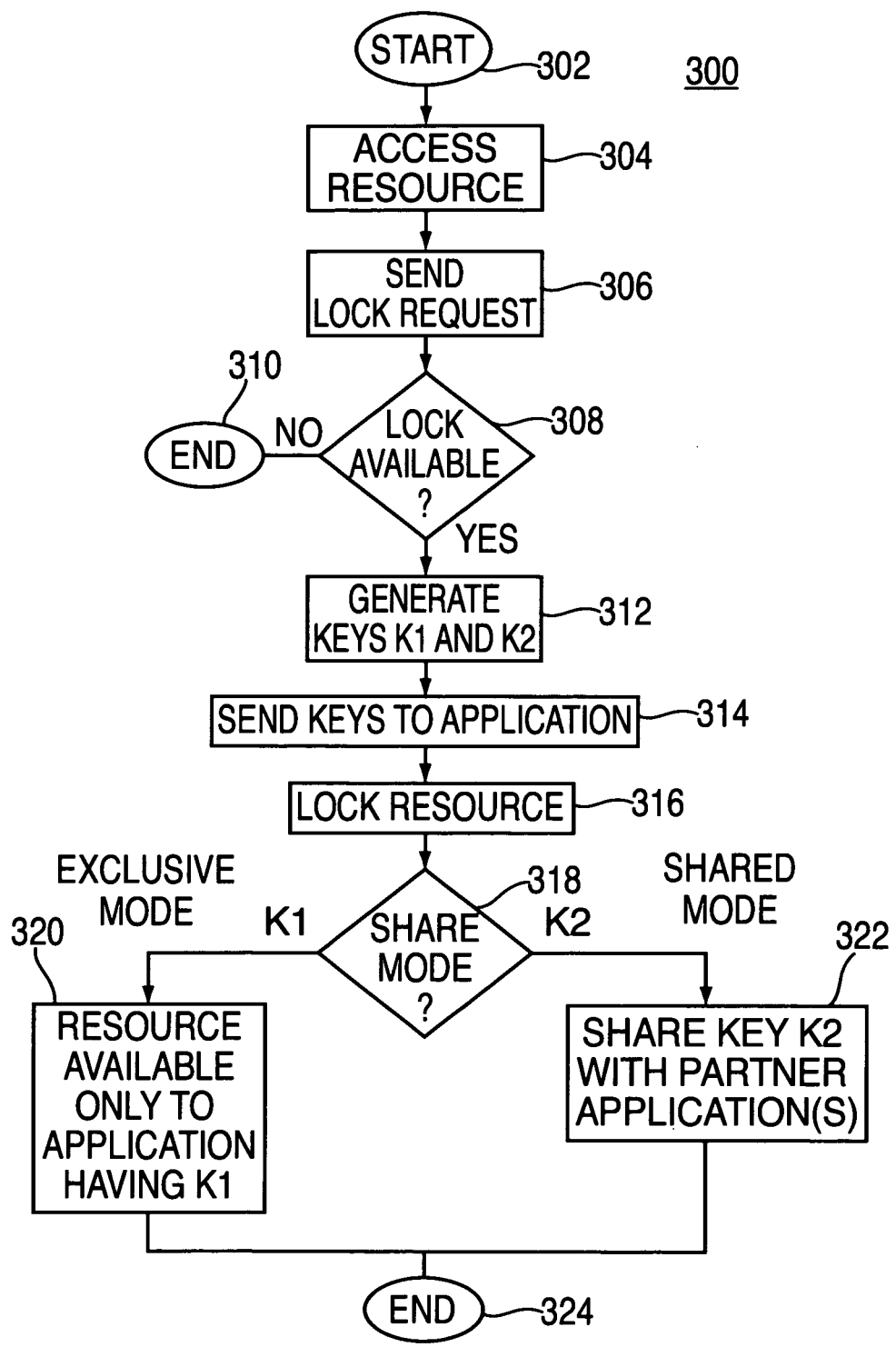
FIG. 3 depicts a flow diagram of a method for providing sharing exclusive mode and shared mode locks in accordance with a second embodiment of the invention.

FIG. 3 depicts flow diagram of a method 300 of locking a resource using the architecture 100 using a two key technique. In this method, the lock manager issues two keys to the requesting application: an exclusive lock mode key and a shared lock mode key. By selectively sharing the keys with partner applications, the application that is provided the keys can then decide in which mode the resource will be locked. The method 300 begins at step 302 and proceeds to step 304 wherein an application 102 accesses a resource 116. At step 306, the lock API 106 requests the lock manager 110 to establish a lock using a request in the following form:

lock (handle, &key_ex, &key_shr)

where the handle identifies the resource to be locked, &key_ex is the exclusive lock mode key (k1) and &key_shr is the shared lock mode key (k2).

At step 308, the method 300 queries whether the lock is available. The lock is deemed available if the resource is not currently locked. If the query is negatively answered, the method 300 ends at step 310. The application 102 will be informed that a lock is unavailable. If the query is affirmatively answered, the method 300 proceeds to step 312 where the lock manager 110 generates unique keys k1 (exclusive mode key) and k2 (shared mode key). At step 314, the keys k1 and k2 are respectively sent to the client as an exclusive lock mode key (&key_ex) and a shared lock mode key (&key_shr). Alternatively, the application 102 provides keys with the request and the lock manager 110 creates locks to match the keys. The resource is locked at step 316.

At step 318, the method 300 queries whether the share mode is exclusive or shared. If the share mode amongst the partner applications is exclusive, the method 300 proceeds to step 320 where the exclusive lock mode key k1 is given to a partner application. The application holding the exclusive lock mode key k1 may exclusively access the resource and all other applications in the group (and outside the group) are blocked from such access. In this mode, the group of partner applications controls access to the resource by sharing the exclusive lock mode key. Thus, serialization is performed amongst the partner applications within the group and the group controls the serialization.

If the mode is shared, the application 102 shares the shared lock mode key k2 with one or more partner applications to facilitate simultaneous access to the resource in the same manner as described with respect to FIG. 2. The method 300 ends at step 324.

In an alternative embodiment of the invention, the dual key embodiment (i.e., having two modes) can be expanded by using colored locks to generate/provide a plurality of keys for a plurality of lock colors. By using a plurality colored keys, the applications that are provided the keys can be categorized into different color modes (i.e., a mode for each color) and the appropriately colored keys can be sent to them accordingly. Thus, partner application groups are formed based on the keys and modes of operation for the group member applications are defined by the colors of the keys that they hold.

In the embodiments of the invention described above, a simple lock counter process can be used to determine when a lock is to be released. Other techniques for lock count monitoring can be used. In the lock count process, for each application that accesses a resource, the lock manager increments the lock count. The lock count tracks the number of client applications that have accessed a given handle for a resource. When an application unlocks a resource (i.e., no longer maintains a lock), the lock count is decremented. When the count reaches a specific value (e.g., the same count value from where the count started when the first lock was taken), the lock manager will destroy the lock structure.

In another embodiment of the invention, rather than using keys, the lock manager, using a registration process, assigns a unique identifier to all the partner applications in a group of compatible applications. Any of the partner applications can access a resource associated with a unique identifier.

FIGS. 4, 5 and 6 depict flow diagrams of methods 400, 500, 600 of another embodiment of the invention. This embodiment assigns a unique identifier to a group of partner applications, where the identifier is used to lock and unlock resources for use by the group. FIG. 4 depicts a flow diagram of a method 400 for registering partner applications. The method begins at step 402 and proceeds to step 404 wherein a plurality of partner applications (a group of compatible applications) register with the lock manager for an exclusive lock. At step 406, the lock manager assigns the group and the resource lock a unique identifier. The method ends at step 408.

FIG. 5 depicts a flow diagram of a method 500 of use of the unique identifier. The method 500 begins at step 502 and proceeds to step 504 where a registered partner application in the group requests a lock. At step 506, the lock manager locks the resource for the group. Subsequently, any registered application in the group may access the resource. All other applications are blocked from such access. The method 500 ends at step 508.

FIG. 6 depicts a flow diagram of a method 600 of unlocking the resource. The method 600 begins at step 602 and proceeds to step 604 where a registered partner application in the group requests the lock be unlocked (dissolved). At step 606, the lock is dissolved for the entire group and, at step 608, the method 600 ends.

Figure 7:
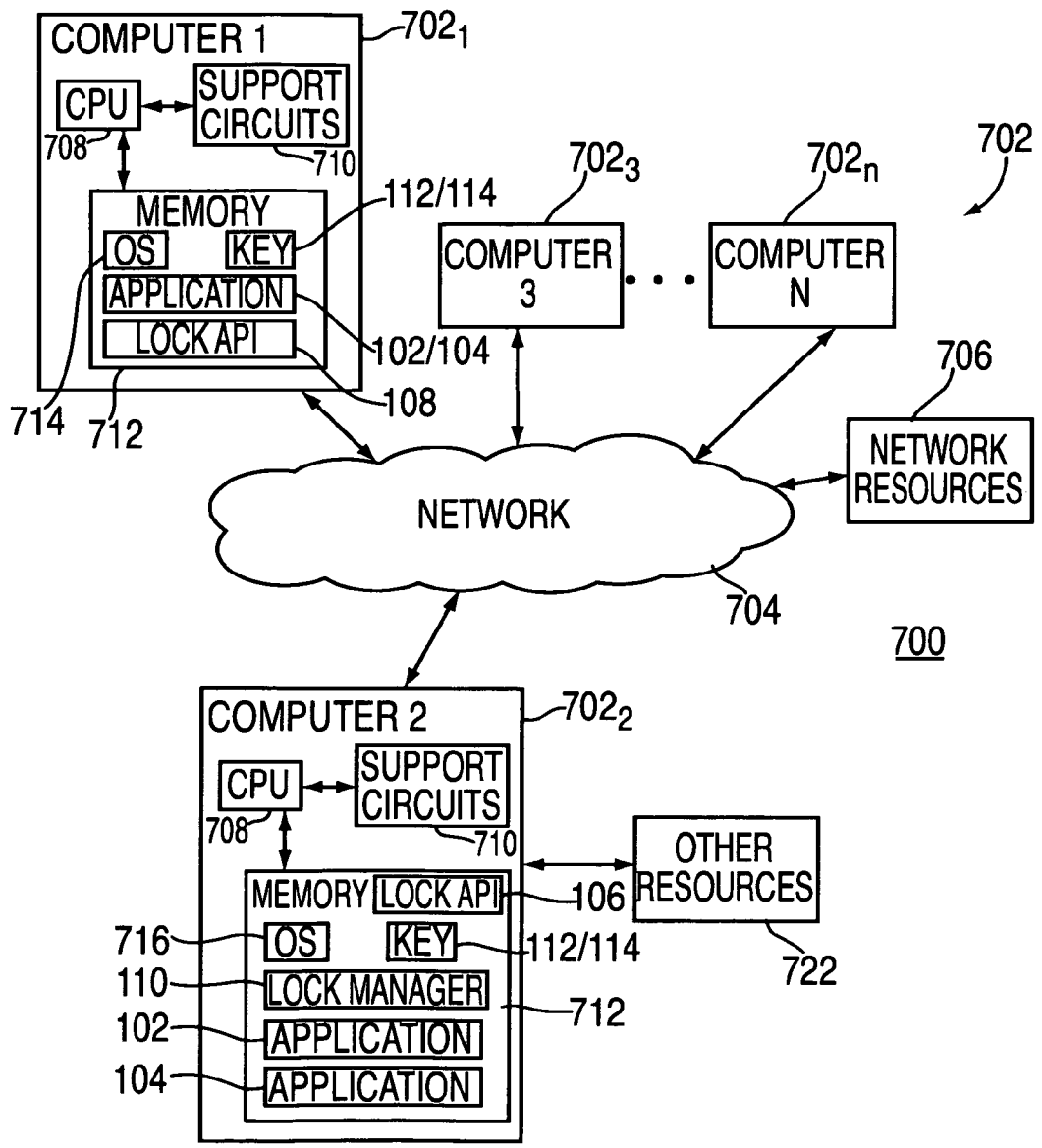
FIG. 7 depicts a block diagram of a multi-node computer network that uses the present invention.

FIG. 7 depicts a block diagram of a multi-node computer network 700 that uses the present invention. The network 700 comprises a plurality of computers $702_1$, $702_2$, ... $702_n$ (collectively clients 702), a communications network 704, and various network resources 706. The computers and resources comprise the nodes of the network. The shared lock invention can be used across multiple nodes (e.g., computers $702_1$ and $702_2$ executing applications that share a lock), within a single computer (e.g., computer $702_2$ executing multiple applications that share a lock), across multiple nodes where the applications and resources are distributed across the network, or in any other situation where a resource requires sharing amongst partner applications. To exemplify the versatility of the invention, FIG. 7 depicts the network having applications executing on computers $702_1$, $702_2$ sharing a resource lock, having applications executing on only computer $702_2$ sharing a resource lock, or both.

Each computer 702, whether a mobile device, desktop computer, server, digital assistant, and the like, comprises a central processing unit (CPU) 708, support circuits 710, and memory 712. The CPU 708 may comprise one or more conventionally available microprocessors or microcontrollers. The support circuits 710 are well known circuits that support the operation of the CPU 708. These circuits 710 may comprise at least one of power supplies, clock circuits, input/output interface circuitry, cache or the like. Memory 712 may comprise random access memory, read only memory, removable disk memory, flash memory, optical memory or various combinations of these types of memory. The memory 712 is sometimes referred to as main memory and may in part be used as cache memory or buffer memory. The memory 712 of computer $702_1$ stores various forms of software and files, such as an operating system (OS) 714, application software 102/104, a lock API 108, and at least one key 112/114 (or a unique identifier) to access locked resources in accordance with embodiments of the present invention.

The memory 712 of computer $702_2$ stores various forms of software and files, such as an operating system (OS) 716, a lock manager 110, applications 102/104 and at least one key 112/114 (or a unique identifier) to enable clients to access locked resources in accordance with embodiments of the present invention. Various resources 722 may be coupled to the computer $702_2$ (or any of the computers 702). These resources are generally made available to the computers 702 of the network 100. These physical resources may include file systems, databases, backup systems and media, and the like.

In operation, the compatible applications 102/104 executing on any of the computers 702 can share resource locks amongst the compatible applications of a single computer or many computers. Such sharing of resource locks enable compatible applications to simultaneously access a resource. Thus, facilitating efficient network or computer operation.

This invention finds use in computer architectures where multiple nodes or single nodes are executing compatible applications that can simultaneously access a resource. For example, in a database application, the application software generally sets a locking bit on a file before starting an input/output operation. During such an operation, the data of the file is not altered. Thus, such applications as a backup application are compatible with the execution of an input/output operation. Using the invention, the database application can send a shared lock mode key to a backup application that may be executing on the same node as the database application or on another node of the network. As such, the backup application may access and backup the file that would otherwise be locked during the input/output operation. Allowing multiple, compatible applications to utilize resources facilitates efficient use of resources.

While the foregoing is directed to embodiments of the present invention, other and further embodiments of the invention may be devised without departing from the basic scope thereof, and the scope thereof is determined by the claims that follow.

The invention claimed is:

1. A method for sharing resource locks amongst applications comprising:
   receiving a lock request, wherein
      the lock request is received from a first application, and
      the lock request specifies that a resource be locked;
   locking the resource using a key and lock combination for the locked resource;
   supplying the key to the first application;
   creating an exclusive lock mode key and a shared lock mode key;
   detecting whether the locked resource is locked according to a shared lock mode or an exclusive lock mode;
   sharing the shared lock mode key with at least one second application to enable the at least one second application to simultaneously access the resource, or sharing the exclusive lock mode key with the at least one second application to enable the at least one second application to have exclusive access to the resource, wherein the sharing comprises sending the key from the first application to the at least one second application; and
   enabling the at least one second application to simultaneously access the resource with the first application.

2. The method of claim 1, wherein
   the locking the resource is performed based on a locking policy.

3. The method of claim 1, wherein
   the first application and the at least one second application form a group of compatible applications that simultaneously access the resource without conflict.

4. The method of claim 1, further comprising:
selecting the at least one second application from a list of known applications that are compatible with the first application, wherein
each known application of the known applications is configured to access the resource simultaneously with the first application without conflicting with the first application.

5. The method of claim 1, wherein
the first application is executed by a first node of a computer network, and
at least one of the at least one second applications is executed by the first node, by a second node of the computer network, or by both the first node and the second node.

6. The method of claim 1, wherein the locking further comprises:
receiving the key from the first application; and
creating a lock for the resource that matches the key.

7. The method of claim 1, further comprising:
incrementing a lock count for each application that accesses the resource using the key;
decrementing the lock count for each application that ceases accessing the resource using the key; and
dissolving the lock on the resource when the lock count reaches a specific value.

8. The method of claim 1, wherein the creating further comprises:
creating a plurality of keys for a plurality of colored locks; and
sharing the plurality of keys with a plurality of second applications, wherein
each color represents a different lock mode that can be utilized by a matching colored key.

9. The method of claim 1, wherein
the first application creates a list of authorized compatible applications, and
the authorized compatible applications are configured to simultaneously access the resource without conflict.

10. A non-transitory computer readable storage medium storing instructions executable by a processor to:
receive a lock request, wherein
the lock request is received from a first application, and
the lock request specifies that a resource be locked;
lock the resource using a key and lock combination for the locked resource;
supply the key to the first application;
create an exclusive lock mode key and a shared lock mode key;
detect whether the locked resource is locked according to a shared lock mode or an exclusive lock mode;
share the shared lock mode key with at least one second application to enable the at least one second application to simultaneously access the resource, or share the exclusive lock mode key with the at least one second application to enable the at least one second application to have exclusive access to the resource, wherein sharing comprises sending the key from the first application to at least one second application; and
enable the at least one second application to simultaneously access the resource with the first application.

11. The non-transitory computer readable storage medium of claim 10, wherein the instructions are further executable to:
select the at least one second application from a list of known applications that are compatible with the first application, wherein
each known application of the known applications is configured to access the resource simultaneously with the first application without conflicting with the first application.

12. An apparatus for sharing resource locks amongst applications comprising:
means for providing a lock manager, wherein the lock manager is configured for
receiving a lock request from a first application to lock a resource,
locking the resource using a key and lock combination,
supplying the key to the first application, and
creating an exclusive lock mode key and a shared lock mode key;
means for detecting whether the locked resource is locked according to a shared lock mode or an exclusive lock mode; and
means for providing a lock Application Programming Interface (API), operating with said first application, wherein
the lock API is configured for
sharing the shared lock mode key with at least one second application to enable the at least one second application to simultaneously access the resource, or sharing the exclusive lock mode key with the at least one second application to enable the at least one second application to have exclusive access to the resource, wherein the sharing comprises sending the key to the at least one second application, and
enabling the at least one second application to simultaneously access the resource with the first application.

13. The apparatus of claim 12, wherein
locking the resource occurs on a first come, first served basis.

14. The apparatus of claim 12, wherein
the first application and the at least one second application form a group of compatible applications that simultaneously access the resource without conflict.

15. The apparatus of claim 12, wherein
the first application is executed by a first node of a computer network, and
at least one of the at least one second applications is executed by the first node, by a second node of the computer network, or by both the first node and the second node.

16. The apparatus of claim 12, wherein
the lock manager receives they key from the first application and creates a lock for the resource that matches the key.

17. The apparatus of claim 12, wherein the lock manager further comprises:
a lock counter, wherein
the lock counter is incremented for each application that accesses the resource using the key,
the lock counter is decremented for each application that ceases accessing the resource using the key, and
the lock manager terminates the lock on the resource when the lock counter reaches a specific value.

18. The apparatus of claim 12, wherein
the lock manager creates a plurality of keys for a plurality of colored locks,
the lock Application Programming Interface (API) shares the plurality of keys with a plurality of applications, and
each color represents a different lock mode that can be utilized by a matching colored key.

* * * * *